No. 720,945. PATENTED FEB. 17, 1903.
F. F. MEYER.
WEIGHING MACHINE.
APPLICATION FILED JUNE 10, 1902.
NO MODEL. 3 SHEETS—SHEET 3.
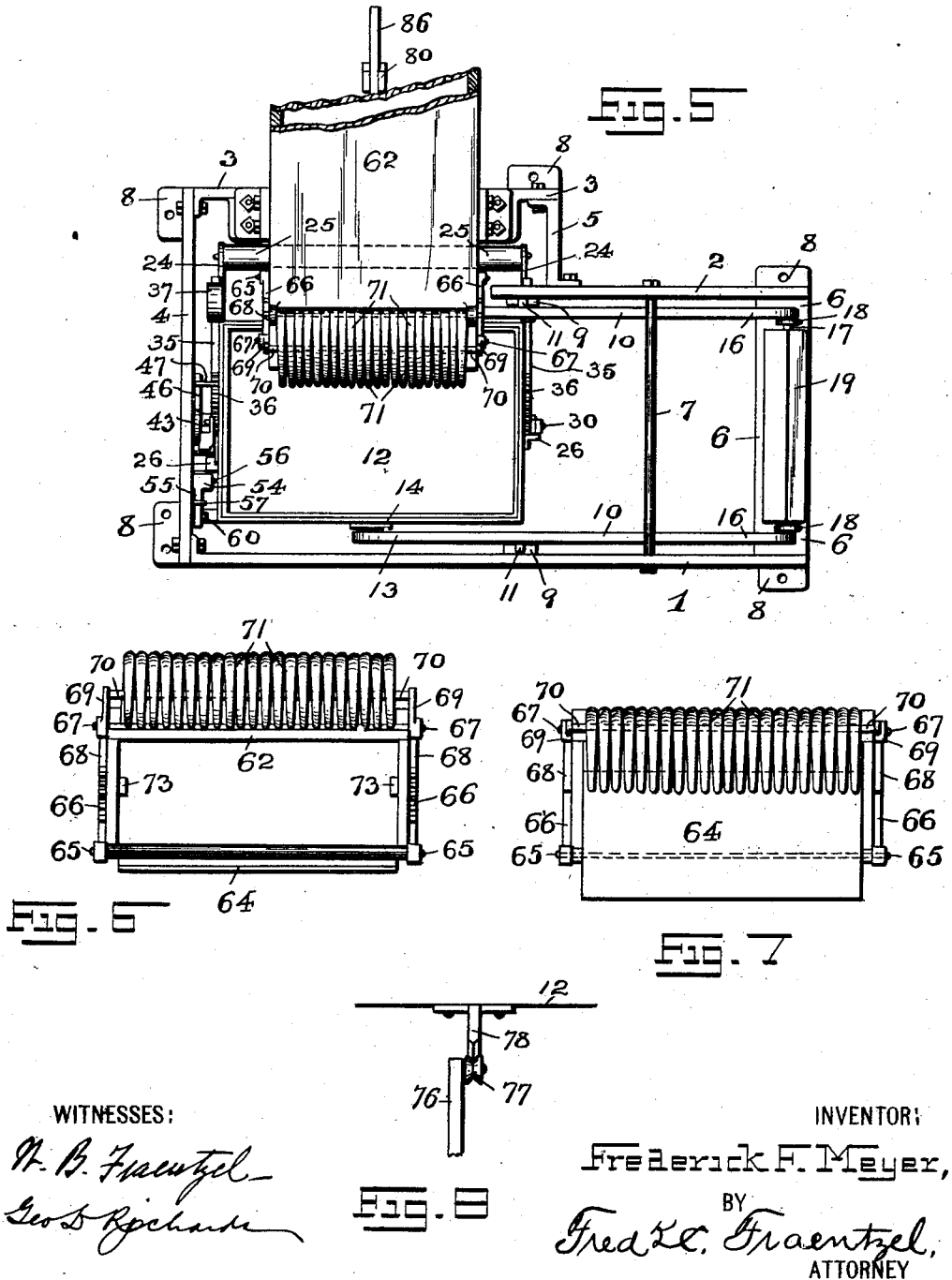
WITNESSES:
INVENTOR:
Frederick F. Meyer,
BY
Fred K C. Fraentzel,
ATTORNEY

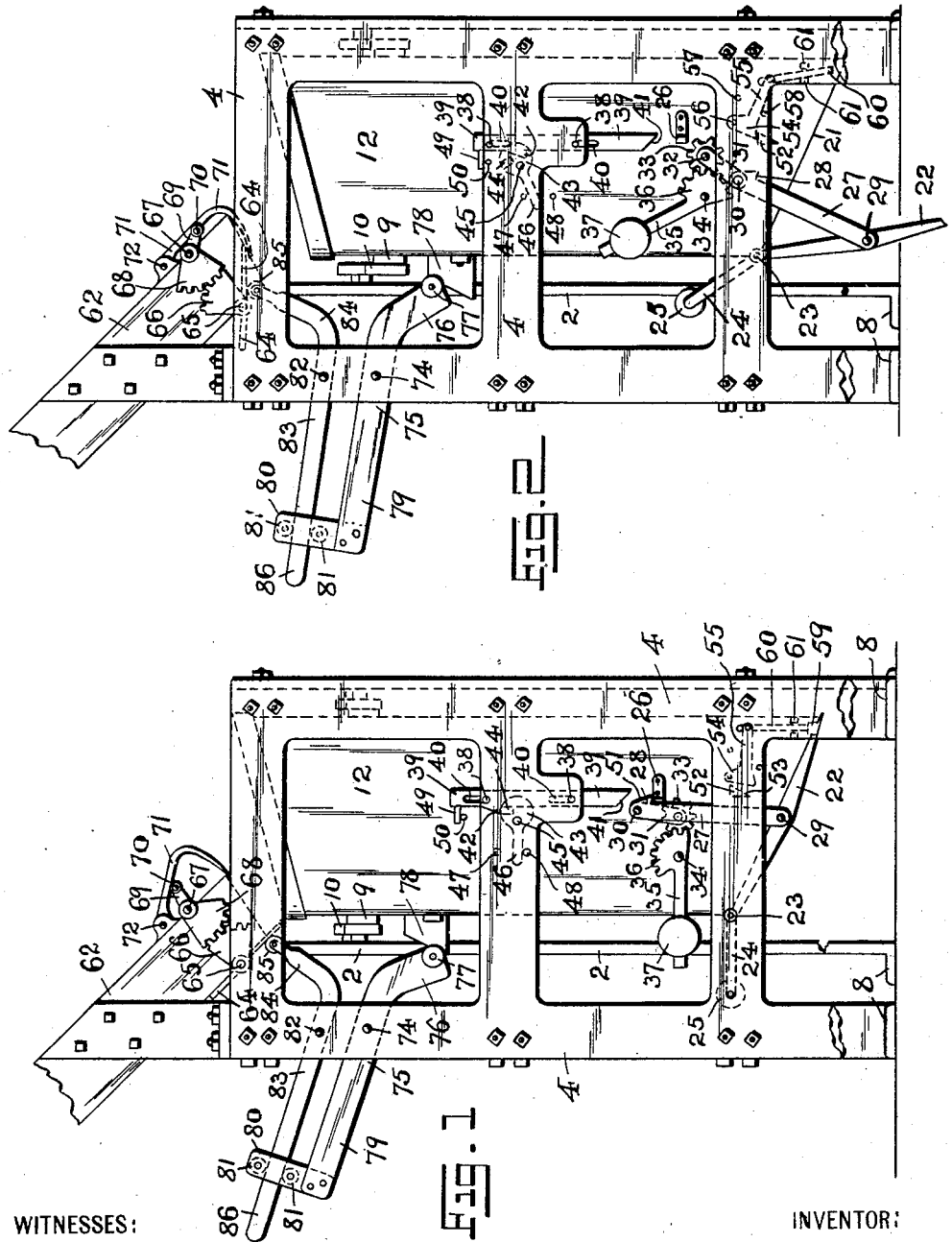

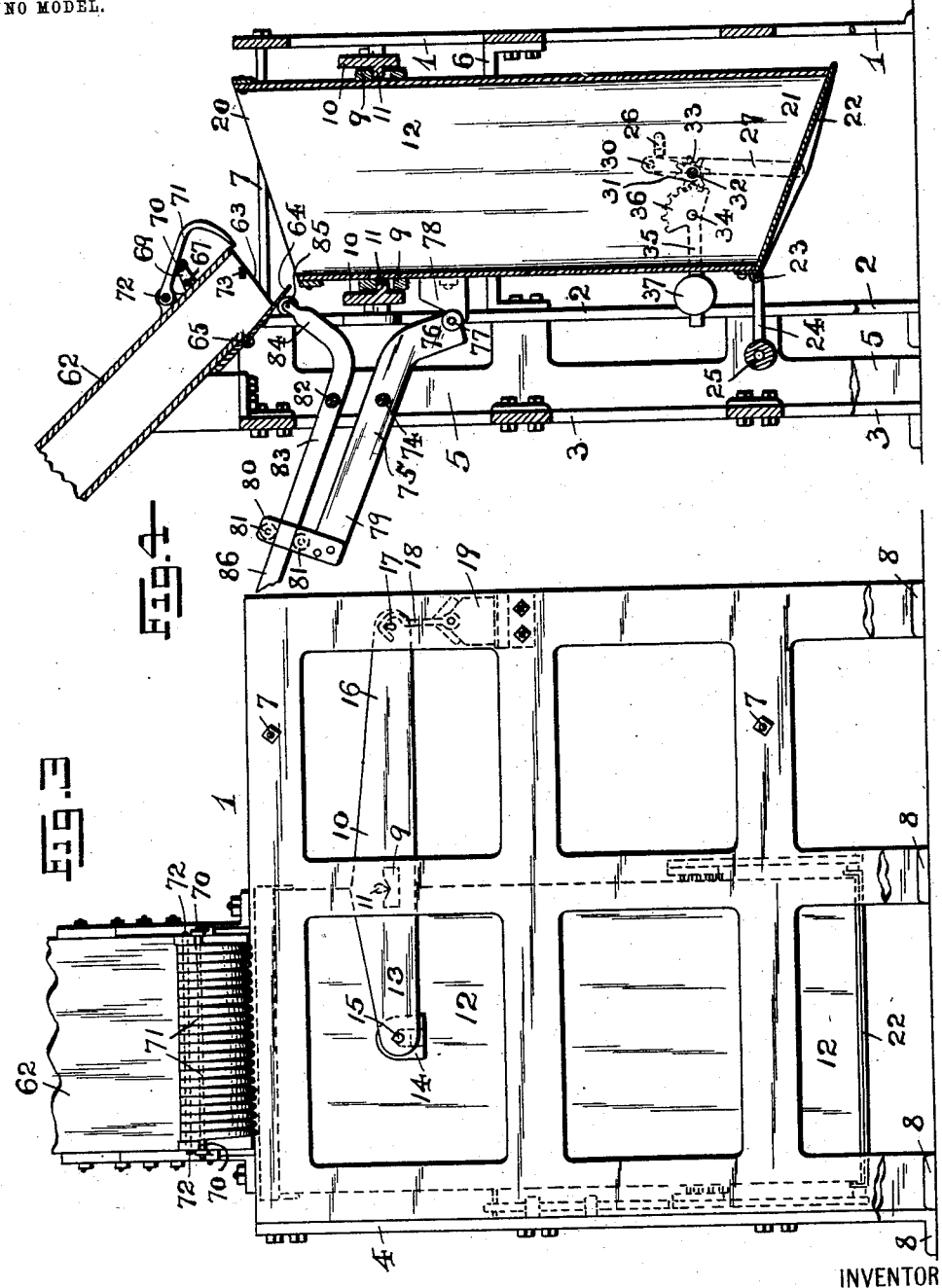

UNITED STATES PATENT OFFICE.

FREDERICK F. MEYER, OF NEWARK, NEW JERSEY.

WEIGHING-MACHINE.

SPECIFICATION forming part of Letters Patent No. 720,945, dated February 17, 1903.

Application filed June 10, 1902. Serial No. 110,989. (No model.)

*To all whom it may concern:*

Be it known that I, FREDERICK F. MEYER, a citizen of the United States, residing at Newark, in the county of Essex and State of New Jersey, have invented certain new and useful Improvements in Weighing-Machines; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.
This invention has reference to improvements generally in automatic weighing-machines, and the present invention is in the nature of improvements in the form and construction of weighing-machine described and claimed in Letters Patent No. 688,537, granted to me on December 10, 1901, with a view of simplifying the general arrangement and construction of the parts of the scales and rendering the device not only practical for the weighing of any desired quantity of grain, sand, and other material of similar character, but being also adapted for the weighing of such materials as soft coals, which contain very large pieces, and at the time when the weight in the weighing-receptacle is nearly complete, the gate mechanism connected with the delivery-chute being such that any such large pieces will be prevented from being deposited in the weighing-receptacle while the smaller particles of coal are still being delivered into the weighing-receptacle until the weight of the delivered coal is complete, at which time the weighed material is emitted from the balanced measuring-receptacle.
The invention consists in the novel weighing or measuring apparatus hereinafter fully set forth; and, furthermore, my invention consists in the various novel arrangements and combinations of the devices and their parts, as well as in the details of the construction of the said parts, all of which will be more particularly described in the accompanying specification and then finally embodied in the clauses of the claim, which form a part of the present specification.

The invention is clearly illustrated in the accompanying drawings, in which—

Figure 1 is a side elevation of a weighing or measuring machine embodying the principles of my present invention, the various parts being represented in their initial normal position while the material to be weighed or measured is being delivered into the weighing-receptacle; and Fig. 2 is a similar view, but illustrating the parts connected with the weighing-receptacle in their operated position while the weighed or measured material is being emitted from the said receptacle, the parts of the delivery-chute being represented in their closed relation. Fig. 3 is a front view of the weighing apparatus, and Fig. 4 is a longitudinal central sectional representation of the various parts in their initial normal positions represented in Fig. 1 of the drawings. Fig. 5 is a top or plan view of the apparatus. Figs. 6 and 7 are front views of the gate mechanism connected with the delivery-chute, the parts being represented in their open positions in said Fig. 6 and in their closed positions in Fig. 7. Fig. 8 is a detail view of a guide connected with the weighing-receptacle and a grooved wheel and part of the actuating mechanism for closing and opening the gate of the delivery-chute.

Similar characters of reference are employed in all of the said above-described views to indicate corresponding parts.

Referring to the several figures of the drawings, the framework is preferably that indicated in the several figures of the drawings, the same comprising a pair of suitably-constructed side frames or standards 1, 2, and 3, the connecting end frame 4, the short connecting member 5 between the two side frames 2 and 3, a connecting end piece or member 6 between the side frames 1 and 2, and the respective tie bolts or rods 7, all arranged substantially as illustrated in Figs. 1 to 5, inclusive; but it will be understood that the general arrangement and construction of the said frame members may be varied without departing from the scope of my present invention. The respective frame members are also provided, preferably, with laterally-extending flanges, as 8, for securing the several frames or standards upon the floor or upon any part of the framework of a mill, coal-trestle, or the like. The said side frames or standards 1 and 2 are each provided on their inner sides and at suitable points with the fulcrumal supports or bearing portions 9, upon each of which rests the usual knife-edge 11 of a pair of parallel beam-arms 10.

The weighing-receptacle, which is preferably of the shape herein shown, is indicated by the reference character 12 and is operatively sustained between the end portions 13 of the said beams 10 by means of fulcrums or shoes 14, which are placed over the knife-edges 15 of the said end portions 13, as illustrated. When empty, the said weighing or measuring receptacle is counterbalanced by the longer lever-arms 16 of the two beams 10, each arm having a knife-edge 17, from each of which is suspended a link 18, having suitably attached to their lower ends a suitable poise or weight 19, the purpose of which is to maintain the proper equilibrium or balance of the several parts of the weighing mechanism. This weight or poise is preferably made in the manner of the construction of the weight or poise described in the said Letters Patent No. 688,537 hereinabove mentioned for the support thereon of other weights of different denominations, according to the desired quantity of matter to be weighed or measured. When the several parts of the weighing-machine are in their normally inactive positions (indicated in Figs. 1, 3, 4, and 5) and while the matter to be weighed or measured is being discharged into the weighing-receptacle 12, then the poise and its weight will rest directly upon the previously-mentioned connecting end piece or member 6. The said weighing-receptacle 12 is provided with an open end 20 at the top and an open-ended bottom 21, the said open end 21 being, however, under normal conditions closed by means of a door or gate 22, which is connected with the said receptacle 12 by means of the hinges 23, and has a pair of rearwardly-extending arms 24 and a weight or balance 25, which help to keep said door or gate 22 in its closed relation against the under side of the receptacle 12 until said door or gate is forced open in the manner to be presently described. In order that the said door or gate may be positively locked or held against opening during the time that the receptacle 12 is being filled with the material to be weighed or measured, the said receptacle 12 is provided upon its opposite sides with suitably-arranged projections or holding-lugs 26, over each of which is arranged a nosing or holding portion 28 of a pair of downwardly-extending holding-arms 27, which are journaled at their lower ends on pins or pivots 29 on opposite edges of the said door or gate 22, as shown. The upper holding end portion of each arm 27 is also provided with a laterally-extending pin 30, on which is journaled a link 31. Each link 31 is in turn pivoted at its opposite end to a rod 32, extending through the receptacle 12, as shown in Fig. 4, from side to side of the receptacle, and secured to said rod 32 and moving with each link 31 is a pinion 33. On another set of pins 34, extending from the opposite sides of the said receptacle 12, are other arms or levers 35, each lever or arm 35 having a toothed segmental portion 36 in mesh with the teeth of the respective pinion 33 and each arm or lever 35 being also provided with a weight 37.

While the receptacle 12 is being filled with the material to be weighed and is in the normally raised position, held so by the horizontal positions of the weighing-beams 10, the door or gate 22 and its parts are in the positions indicated in Figs. 1 and 4 and the door is tightly closed.

To force the nosing or holding portion 28 of each arm 27 from the projections or lugs 26 on the opposite sides of the receptacle 12, I have arranged upon the inner surface of one of the frames or standards, as 1, so as to slide upon a pair of guide-pins 38 on said frame, a bolt 39, provided with the slots 40, in which the said pins 38 are arranged, and each bolt having the lower inclined edge 41. The said bolt 39 is provided with a nosing or holding projection 42, which normally rests upon a projection or offset 44 on an eccentric or other holding device 43, pivotally arranged on a pin 45 on the inner side of the frame-section 1 and having a laterally-extending arm 46, which extends between a pair of vertically-arranged pins 47 and 48, extending from the side of the receptacle 12, as illustrated. The said bolt 39 is also provided at its upper end portion with a finger 49, with which is adapted to be brought in lifting engagement a pin or projection 50, extending from the side of said receptacle 12, for retaining the said bolt 39 in its normally raised position. (Indicated in Fig. 1.) At the same time the eccentric 43 is so arranged that it also will hold in its raised position.

Now suppose the receptacle 12 has been filled with the quantity of the material to be weighed equal to the weight desired and that the receptacle 12 is moved in a downward direction by the action of the weighing-beams 10. Then the pin 50 will move away from its engagement with the finger 49 of the bolt and the upper pin 47 will be brought against the arm 46 of the eccentric 43, thereby removing the projection or offset 44 of said eccentric from its holding engagement with the nosing or projection 42 of the tie-bolt 39, as indicated in Fig. 2 of the drawings. Immediately the lower inclined edge 41 of said bolt 39 drops upon an inclined edge 51 of the holding portion of the gate-holding arm 27 beneath, thereby producing a partial rotary motion of the rod 32 and throwing the holding portions or nosings 28 of both arms 27 from engagement with the projections or lugs 26 on the side of the receptacle 12. The weight of the material in the receptacle immediately opens the door or gate 22, as indicated in said Fig. 2, the various parts assuming the relative positions represented in said figure. As soon as the material has been discharged from the receptacle the balance 25 and the weights 37 of the arms or levers 35 will again close the gate or door 22 against the lower open-ended portion of the receptacle 12. While the door or gate 22 is in its open position (indicated in said Fig. 2) and said bolt 39 is also in its lowered position, the finger 49 of the bolt is again directly above the said pin or projection 50 of the receptacle, and during the upward return of the receptacle 12 the said pin 50 raises the said bolt 39 to its former position. (Indicated in Fig. 1.) The pin 48 is now also brought in lifting engagement with the arm 46 of the eccentric 43, whereby the latter is brought into its initial normal position, with its projection or offset 44 once more in its holding relation with the nosing or offset 42 of the bolt 39.

To retain the weighing-receptacle 12 in its lowered position (indicated in Fig. 2) while emitting its contents, I have provided the said receptacle 12 with a projection 52, having an inclined surface 53, adapted to be brought in sliding engagement with a correspondingly formed and inclined surface of the portion 54 of a lever 55, pivoted on a pin 56, against the inner surface of the frame-section. When the said projection 52 has passed below the said portion 54, then said portion will act as a stop, and thereby holds the lowered weighing-receptacle 12 in its lowered position, as will be clearly evident. A pair of pins 57 and 58 limit the pivotal movement of said lever 55. When the gate or door 22 returns to its initial closing position, a projection 59 on said door will strike the end of a rod 60, movably arranged between guide-pins 61 and connected with the free end of said lever 55, whereby the said portion 54 is raised sufficiently above the projection 52 and permits the upward movement of the weighing-receptacle 12 to its initial normal position, as will be clearly evident.

Suitably arranged and secured above the upper open end portion 20 of the weighing-receptacle 12 is a delivery-chute 62, from which the material which is to be weighed or measured is delivered into the receptacle 12 while the gate or door 22 is in its closed relation against the lower open end portion 21 of the said receptacle 12.

As will be seen from the several figures of the drawings, the delivery-chute 62 has pivotally attached to its under side, at a point near the delivery-opening of the chute, a gate 64. The said gate 64 is secured to a cross-rod 65, to which are secured on opposite sides of the chute the toothed sectors 66. Upon the upper portion of the said chute in suitable bearings is another cross-rod 67, to which are secured a second set of toothed sectors 68, having their teeth in operative mesh with the gear-teeth of the sectors 66, and 69 represents a pair of arms on said rod 67, bearing another rod or bar 70, upon which rest a number of hook-shaped or pronged members 71, as shown. These members are pivotally arranged side by side upon a rod 72 on said chute 62, and when the gate 64 is in its closed position, closing the lower half of the delivery-opening 63 of the chute 62, as indicated in Figs. 2 and 7, then the said prongs or hooks of the members 71 will be arranged over the upper half of the said delivery-opening, and thereby close the same in the manner and for the purposes to be presently set forth. A stop 73, connected with the delivery-chute 62, limits the closing action of the said gate 64.

To produce the closing action of the gate 64 and other parts connected with the chute 62, I have pivotally arranged upon a spindle or bar 74 an arm or lever 75, having a downwardly-extending end portion 76, provided with a suitably-arranged grooved wheel or roller 77 in rolling contact with the V-shaped edge of a plate or shoe 78, extending from the side of the weighing-receptacle 12. The long arm portion 79 of said lever or arm 75 is made with a yoke-shaped frame 80, provided with a pair of guide-rollers 81. Pivotally arranged upon an upper spindle or supporting-bar 82 is a second arm or lever 83, provided with an upwardly-extending arm portion 84 and a bearing-roller 85, upon which the pivoted gate 64 rests, substantially in the manner illustrated in said Figs. 1, 2, and 4 of the drawings. The rearwardly-extending and long arm portion 86 of said arm or lever 83 extends directly into the said yoke-shaped frame 80 and is slidably and operatively arranged between the said two rollers 81. From an inspection of the said figures of the drawings it will be seen that when the receptacle 12 moves downward the lower arm or lever 75, its roller 77 moving upon the shoe 79, causes the upwardly-extending arm portion 84 of the lever or arm 83 to move in an upward direction, its roller 85 bearing against the lower surface of the gate 64 and bringing it in its closing position against the end of the delivery-chute. This movement of the gate 64 actuates the two toothed sectors 66 and 68, whereby the supporting-rod 70 is brought in a lowered position to cause the hook portions or prongs of the members 71 to arrange themselves in their closing relation directly in front of the upper half of the opening in the delivery-chute.

The operations of the several mechanisms will be clearly understood from the previous description of my invention and from an inspection of the several figures of the drawings, and the many advantages are evident, and a simple and operative construction has been devised.

The arrangement of the pronged or hook-shaped members 71 is of great advantage in that the apparatus can be used for successfully weighing soft coal, the independently-moving members arranging themselves upon a large piece of coal and holding it in the mouth of the delivery-chute at the time of their descent when the receptacle 12 moves in its downward direction, and thereby preventing any overweight of the coal, as will be clearly understood.

Of course in weighing grain, sand, or the like the said members 71 and connecting parts are dispensed with, the gate 64 being of such construction that it will close the entire opening of the delivery-chute 62.

I am aware that changes may be made in the various arrangements and combinations of the devices and parts herein set forth without departing from the scope of my present invention. Hence I do not limit my invention to the exact arrangements and combinations of the several devices and their parts as described in the specification and as illustrated in the drawings, nor do I confine myself to the exact details of the construction thereof.

Having thus described my invention, what I claim is—

1. In an automatic weighing-machine, the combination with a weighing-beam and its poise, of a weighing-receptacle, the said weighing-receptacle being provided with an open bottom, a gate hinged to the said bottom, and means for normally holding said gate in its closed position against said bottom, consisting, essentially, of a lug extending from the side of said receptacle, a connecting-arm pivotally attached to said gate, and a holding portion on said arm in detachable holding engagement with said lug, and means adapted to be brought in sliding engagement with a portion of said arm for disengaging the said holding portion of said arm from said lug, substantially as and for the purposes set forth.

2. In an automatic weighing-machine, the combination, with a weighing-beam and its poise, of a weighing-receptacle, the said weighing-receptacle being provided with an open bottom, a gate hinged to the said bottom, and means for normally holding said gate in its closed position against said bottom, consisting, essentially, of a lug, extending from the side of said receptacle, a connecting-arm pivotally attached to said gate, and a holding portion on said arm in detachable holding engagement with said lug, and a sliding bolt adapted to be brought in engagement with a portion of said arm for disengaging the said holding portion of said arm from said lug, substantially as and for the purposes set forth.

3. In an automatic weighing-machine, the combination, with a weighing-beam and its poise, of a weighing-receptacle, the said weighing-receptacle being provided with an open bottom, a gate hinged to the said bottom, and means for normally holding said gate in its closed position against the said bottom, consisting, essentially, of a lug extending from the side of said receptacle, a connecting-arm pivotally attached to said gate, and a holding portion on said arm in detachable holding engagement with said lug, and a sliding bolt adapted to be brought in engagement with a portion of said arm for disengaging the said holding portion of said arm from said lug, a holding-lug on said bolt, an eccentric provided with a projection in normal engagement with the holding-lug of said bolt for retaining said bolt in its normally raised position, and means on said weighing-receptacle adapted to engage with said eccentric during the descent of the said weighing-receptacle to release said bolt and permit of its engagement with said connecting-arm of said door, substantially as and for the purposes set forth.

4. In an automatic weighing-machine, the combination, with a weighing-beam and its poise, of a weighing-receptacle, the said weighing-receptacle being provided with an open bottom, a gate hinged to the said bottom, and means for normally holding said gate in its closed position against the said bottom, consisting essentially, of lugs extending from the opposite sides of said receptacle, a rod 32 extending from side to side of said receptacle, pinions at the opposite ends of said rod, counterbalanced arms, and toothed segments on said arms, said arms being pivoted on opposite sides of said weighing-receptacle and said segments being in mesh with said pinions, a link at each end of said rod 32, and a connecting-arm connected with each link and with said gate, and a holding portion on each connecting-arm in holding engagement with the lugs of said weighing-receptacle, substantially as and for the purposes set forth.

5. In an automatic weighing-machine, the combination, with a weighing-beam and its poise, of a weighing-receptacle, the said weighing-receptacle being provided with an open bottom, a gate hinged to the said bottom, and means for normally holding said gate in its closed position against the said bottom, consisting, essentially, of lugs extending from the opposite sides of said receptacle, a rod 32 extending from side to side of said receptacle, pinions at the opposite ends of said rod, counterbalanced arms, and toothed segments on said arms, said arms being pivoted on opposite sides of said weighing-receptacle and said segments being in mesh with said pinions, a link at each end of said rod 32, and a connecting-arm connected with each link and with said gate, and a holding portion on each connecting-arm in holding engagement with the lugs of said weighing-receptacle, and means adapted to be brought in sliding engagement with a portion of one of said connecting-arms for forcing both of the said connecting-arms from their holding engagement with said lugs on the sides of said weighing-receptacle, substantially as and for the purposes set forth.

6. In an automatic weighing-machine, the combination with a weighing-beam and its poise, of a weighing-receptacle, the said weighing-receptacle being provided with an open bottom, a gate hinged to the said bottom and means for normally holding said gate in its closed position against the said bottom, consisting, essentially, of lugs extending from the opposite side of said receptacle, a rod 32 extending from side to side of said receptacle, pinions at the opposite ends of said rod, counterbalanced arms, and toothed segments on said arms, said arms being pivoted on opposite sides of said weighing-receptacle and said segments being in mesh with said pinions, a link at each end of said rod 32, and a connecting-arm connected with each link and with said gate, and a holding portion on each connecting-arm in holding engagement with the lugs of said weighing-receptacle, and a sliding bolt adapted to be brought in engagement with a portion of one of said connecting-arms for forcing both of the said connecting-arms from their holding engagement with said lugs on the sides of said weighing-receptacle, substantially as and for the purposes set forth.

7. In an automatic weighing-machine, the combination, with a weighing-beam and its poise, of a weighing-receptacle, the said weighing-receptacle being provided with an open bottom, a gate hinged to the said bottom, and means for normally holding said gate in its closed position against the said bottom, consisting, essentially, of lugs, extending from the opposite sides of said receptacle, a rod 32 extending from side to side of said receptacle, pinions at the opposite ends of said rod, counterbalanced arms, and toothed segments on said arms, said arms being pivoted on opposite sides of said weighing-receptacle and said segments being in mesh with said pinions, a link at each end of said rod 32, and a connecting-arm connected with each link and with said gate, and a holding portion on each connecting-arm in holding engagement with the lugs of said weighing-receptacle, and a sliding bolt adapted to be brought in engagement with a portion of one of said connecting-arms for forcing both of the said connecting-arms from their holding engagement with said lugs on the sides of the said weighing-receptacle, a holding-lug on said bolt, an eccentric provided with a projection, in normal engagement with the holding-lug of said bolt for retaining said bolt in its normally raised position, and means on said weighing-receptacle adapted to engage with said eccentric during the descent of the said weighing-receptacle to release said bolt and permit of its engagement with said connecting-arm of said door, substantially as and for the purposes set forth.

8. In an automatic weighing-machine, the combination, with a weighing-receptacle, having an open bottom, and a hinged closing-gate, of gate-closing means for normally retaining said gate in its closed relation to said weighing-receptacle and a sliding bolt adapted to be brought in engagement with a portion of said gate-closing means for actuating said gate-closing means and thereby opening the said gate, substantially as and for the purposes set forth.

9. In an automatic weighing-machine, the combination, with a weighing-receptacle having an open bottom, and a hinged closing-gate, of gate-closing means for normally retaining said gate in its closed relation to said weighing-receptacle, and a sliding bolt adapted to be brought in engagement with a portion of said gate-closing means for actuating said gate-closing means and thereby opening the said gate, and means connected with said bolt for normally retaining said bolt in a raised position, consisting, essentially, of a holding-lug on said bolt, an eccentric provided with a projection in normal engagement with the said holding-lug of said bolt, and means on said weighing-receptacle adapted to engage with said eccentric during the descent of said weighing-receptacle to release said bolt, substantially as and for the purposes set forth.

10. In an automatic weighing-machine, the combination, with a weighing-receptacle having an open bottom, and a hinged closing-gate, of gate-closing means for normally retaining said gate in its closed relation to said weighing-receptacle, and a sliding bolt adapted to be brought in engagement with a portion of said gate-closing means for actuating said gate-closing means and thereby opening the said gate, and means connected with said bolt for normally retaining said bolt in a raised position consisting, essentially, of a holding-lug on said bolt, an eccentric provided with a projection in normal engagement with the said holding-lug of said bolt, and means on said weighing-receptacle adapted to engage with said eccentric during the descent of said weighing-receptacle to release said bolt, comprising an arm connected with said eccentric, and a pair of projections 47 and 48 on said weighing-receptacle, extending respectively above and below the said eccentric-arm, substantially as and for the purposes set forth.

11. In an automatic weighing-machine, the combination, with a weighing-receptacle having an open bottom, and a hinged closing-gate, of means for normally retaining said gate in its closed relation to said weighing-receptacle, and means constructed and arranged for holding said weighing-receptacle in its lowered position while said gate is open, consisting, essentially, of a projection 52, a pivoted lever having an enlarged portion 54, guide-pins 57 and 58 between which said pivoted lever is movably arranged, a rod 60 connected with said pivoted lever, guide projections 61 between which said rod 60 is movably arranged, and means on said gate adapted to be brought in operative engagement with said lever 60, substantially as and for the purpose set forth.

12. The combination, with a chute, of means for closing the end of said chute, consisting of a hinged gate and a series of pivotally-arranged pronged members, and a connecting means between said gate and said pronged members, whereby a movement of the gate will simultaneously produce the movements of said pronged members, consisting of a cross-rod 67, arms 69 on said rod 67, a rod 70 between said arms 69 on which the said pronged members rest, and toothed sectors between said gate and said cross-rod 67, substantially as and for the purposes set forth.

In testimony that I claim the invention set forth above I have hereunto set my hand this 4th day of June, 1902.

FREDERICK F. MEYER.

Witnesses:
FREDK. C. FRAENTZEL,
GEO. D. RICHARDS.